United States Patent Office 2,708,197
Patented May 10, 1955

2,708,197

PREPARATION OF (HYDROXY-3-INDOLE)-ALKYLAMINES

Merrill E. Speeter, Kalamazoo Township, Kalamazoo County, Mich., assignor to The Upjohn Company, Kalamazoo, Mich., a corporation of Michigan No Drawing. Application May 24, 1952,
Serial No. 289,872

23 Claims. (Cl. 260—319)

The present invention relates to a novel process for the preparation of organic compounds, and is more particularly concerned with a novel process for the preparation of (hydroxy-3-indole)-alkylamines, and with the products thus-produced. This application is a continuation-in-part of my prior filed copending applications Serial Number 279,931, filed April 1, 1952, and Serial Number 265,045, filed January 4, 1952, and now abandoned.

The compounds prepared by the novel process of the present invention may be represented by the formula:

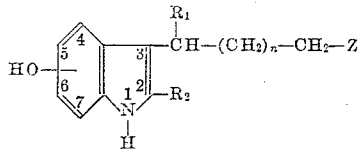

wherein $R_1$ and $R_2$ represent hydrogen or lower-alkyl, and $n$ is selected from zero or one. Z represents the amino radical

wherein $R_3$ and $R_4$ represent hydrogen, alkyl, cycloalkyl, phenyl, and aralkyl. The amino radicals thus represented by Z include such radicals as the unsubstituted amino —$NH_2$, alkylamino, cycloalkylamino, aralkylamino, phenylamino, dicycloalkylamino, diaralkylamino, dialkylamino, diphenylamino, alkyl aralkylamino, alkyl cycloalkylamino, alkyl phenylamino, aralkyl cycloalkylamino, aralkyl phenylamino, or cycloalkyl phenylamino, and $R_3$ and $R_4$ taken together with the nitrogen also represent a monoheterocyclic amino radical selected from five and six atom monoheterocyclic amino radicals, including amino radicals such as piperidyl, morpholyl, thiomorpholyl, pyrrolidyl, or the like.

It is an object of the present invention to provide a novel process for the preparation of (hydroxy-3-indole)-alkylamines and salts thereof. It is a further object of the present invention to provide a novel process for the preparation of (4-hydroxy-3-indole)-alkylamines, (5-hydroxy-3-indole)-alkylamines, (6-hydroxy-3-indole)-alkylamines, (7-hydroxy-3-indole)-alkylamines, acid addition, and quaternary ammonium salts thereof. Other objects of the present invention will be apparent to one skilled in the art to which the invention pertains.

The compounds produced by the novel process of the present invention, the (hydroxy-3-indole)-alkylamines, have demonstrated potent vasoconstrictor qualities. The isolation of serotonin creatinine sulfate, 5-hydroxy-3-(2-aminoethyl)-indole creatinine sulfate, was first announced by Rapport [J. Biol. Chem., 180, 961 (1949)] and the compound was definitely shown to possess vasoconstrictor properties. Similarly other analogs of serotonin, prepared by the novel process of the present invention, such as bufotenin, 5-hydroxy-3-[2-(N,N-dimethylamino)-ethyl]-indole (Karrer, Organic Chemistry, 2nd English edition, Elsevier Publishing Company, New York, page 764), 5-hydroxy-3-[2-(N-methylamino)-ethyl]-indole, 5-hydroxy-3-[2-(N-isopropylamino)-ethyl]-indole, and the like, have exhibited similar pharmacological activity.

According to the method of the present invention the (hydroxy-3-indole)-alkylamines are prepared by the debenzylation of the (benzyloxy-3-indole)-alkylamines represented by the formula:

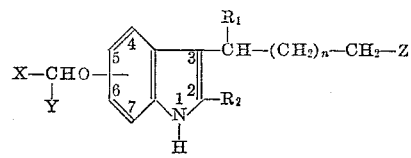

wherein X represents phenyl, halophenyl, lower alkoxyphenyl, or lower alkylphenyl, Y represents hydrogen, phenyl, halophenyl, lower alkoxyphenyl, or lower alkylphenyl, and $R_1$, $R_2$, $n$, and Z have the same values as specified above.

The starting compounds for the process of the present invention, the (benzyloxy-3-indole)-alkylamines, are prepared by the reduction of a (benzyloxy-3-indole)-alkanoylamide represented by the formula:

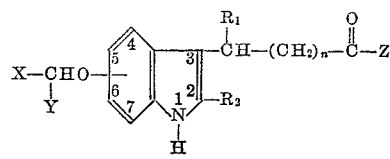

wherein X, Y, $R_1$ $R_2$, and $n$, have the values specified above, and wherein Z represents the amido radical

Representative reducing agents include metal hydrides such as lithium aluminum hydride, lithium borohydride, and the like, with lithium aluminum hydride being preferred. The reduction of the (benzyloxy-3-indole)-alkanoylamides can also be accomplished catalytically, in which case platinum is the preferred catalyst. The non-catalytic reduction is usually conducted in an organic solvent, with tetrahydrofuran being preferred, although other well known solvents such as isopropyl ether, ether, N-methylmorpholine, dioxane, and the like may also be used. The reduction of the (benzyloxy-3-indole)-alkanoylamides is usually accomplished at the boiling point of the solvent used, although other temperatures between about zero and 100 degrees may be employed, and preferably zero to 65 degrees centigrade when lithium aluminum hydride is the reducing agent utilized. After a reaction period of from thirty minutes to five hours, the (benzyloxy-3-indole)-alkylamine free bases are readily obtained as heavy non-crystalline oils, or in some instances as crystalline compounds, by hydrolyzing the reaction product with aqueous ether followed by dilute alkali, extracting the alkaline residue with several portions of ether, combining the ether extracts, and concentrating and evaporating the solvent. Other conventional procedure for the hydrolysis may be used if desired, and other organic solvents may be used in place of ether. A preferable manner of procedure, however, resides in reacting the free base, without isolation, with a stoichiometric quantity of an acid, such as hydrochloric, hydrobromic, sulfuric, acetic, tartaric, citric, or the like, to form the (benzyloxy-3-indole)-alkylamine acid addition salt. Similarly a quaternary ammonium salt may also be prepared by reacting the tertiary amine free base with an alkyl halide or aralkyl halide and such quaternary ammonium salts include the methochloride, ethobromide, benzyl chloride, and the like. In this manner, the free base may be separtaed as its crystalline salt, e. g., hydrochloride, which usually precipitates from the solution. Alternatively the free base may be isolated by removal of the solvent and admixed with a stoichiometric quantity of an acid, e. g., hydrochloric, to form the corresponding acid addition salt or the isolated tertiary amine free base may be mixed with an alkyl halide or aralkyl halide to form the quaternary ammonium salt of the (benzyloxy-3-indole)-alkylamine employed. The (benzyloxy-3-indole)-alkylamine salts, so obtained, may be removed by filtration and so utilized, or the resulting salt precipitate may be further purified, if desired, by recrystallizing from alcohol-water solutions such as methanol-water, ethanol-water, isopropanol-water, and the like, with ethanol-water being preferred.

The (benzyloxy-3-indole)-alkanoylamides are prepared by the Grignard reaction of a benzyloxyindole represented by the formula:

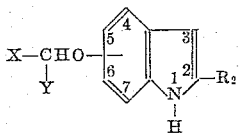

wherein X, Y and $R_2$ have the same values as specified above, with a holoalkanoylamide represented by the formula:

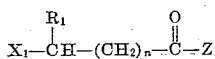

wherein $X_1$ represents a halogen i. e., chlorine, iodine, or bromine, and wherein $n$, $R_1$, and Z have the values specified above. Representative haloalkanoylamides include the α-haloacetamides, β-halopropionamides, or the like. The starting 5-benzyloxyindoles and 6-benzyloxyindoles may be prepared according to the method of Burton and Stoves [J. Chem. Soc. 1937, 1726]. An alternative method for the preparation of the 5-benzyloxyindoles involves the reductive cyclization of the 5-benzyloxy-β,2-dinitrostyrenes, as more fully disclosed in my copending application Serial Number 273,149, filed February 23, 1952. The 5-benzyloxy-β,2-dinitrostyrenes are prepared by the dehydration of the 5-benzyloxy-2-nitro-α-[1-(1-nitroalkyl)]benzyl alcohols, as more fully disclosed in my copending application Serial Number 273,148, filed February 23, 1952. The 5-benzyloxy-2-nitro-α-[1-(1-nitroalkyl)]benzyl alcohols are prepared by the condensation of 5-benzyloxy-2-nitrobenzaldehydes with a 1-nitroalkane, as more fully disclosed in my copending application Serial Number 273,147, filed February 23, 1952. The 5-benzyloxy-2-nitrobenzaldehydes are prepared according to the method of Burton [J. Chem. Soc., 1935, 1265] or Portmann and Giovannini [Helv. Chim. Acta, 31, 1381 (1948)]. The starting 7-benzyloxyindoles are prepared by the benzylation of a 3-hydroxy-2-nitrobenzaldehyde (Hodgson et al., J. Chem. Soc. 127, 877), with a benzyl halide such as benzyl chloride, para-methylbenzyl bromide, and the like, to produce a 3-benzyloxy-2-nitrobenzaldehyde. The preparation of the 7-benzyloxyindole from the thus-produced 3-benzyloxy-2-nitrobenzaldehyde thereafter follows the identical process utilized in the preparation of the 5-benzyloxyindole from the starting 5-benzyloxy-2-nitrobenzaldehyde as outlined above. In a similar manner the 4-benzyloxyindoles are prepared by the benzylation of a 6-hydroxy-2-nitrobenzaldehyde (Ashley et al., J. Chem. Soc. 1930, 382–393), with a benzyl halide to produce a 6-benzyloxy-2-nitrobenzaldehyde, whereafter the 4-benzyloxyindoles are prepared from the thus-produced 6-benzyloxy-2-nitrobenzaldehyde by the identical process utilized in the preparation of the 5-benzyloxyindole from the starting 5-benzyloxy-2-nitrobenzaldehyde as previously discussed.

The Grignard reaction, for the preparation of (benzyloxy-3-indole)-alkanoylamides, is usually carried out in the presence of an organic solvent, diethyl ether and dibutyl ether being preferred, although other organic solvents, suitable for use in Grignard reactions, such as benzene, toluene, or anisole, can also be employed. In some instances dimethylformamide may also be utilized. A great many Grignard reagents are satisfactory, among them being those prepared from alkyl halides, cycloalkyl halides, aryl halides, and aralkyl halides, the lower-alkyl halides, such as methyl iodide and ethyl iodide being preferred. The preparation of the benzyloxyindole Grignard reagent is usually conducted at the boiling point of the solvent employed, although other temperatures between about zero and 150 degrees centigrade, preferably between about zero and 100 degrees centigrade, may also be used, a longer reaction period being required in the lower temperature ranges. The resulting benzyloxyindolemagnesium halide is then reacted with a haloalkanoylamide, such as the α-haloacetamides, β-halopropionamides, or the like, in the presence of the same organic solvent utilized in the preparation of the Grignard reagent although others may also be used if desired. The reaction of the haloalkanoylamide and the benzyloxyindolemagnesium halide is usually conducted at the boiling point of the solvent employed, although other temperatures between about zero and 150 degrees centigrade, preferably about 100 degrees centigrade may also be used. Upon removal of the organic solvent by distillation, the remaining residue is heated on a steambath, and a heavy oil is obtained upon cooling. The (benzyloxy-3-indole)-alkanoylamides may then be isolated from the oil, or in some instances the (benzyloxy-3-indole)-alkanoylamides need not be isolated as a crystalline product, in hich case the oil may be treated directly with a reducing agent to produce the desired (benzyloxy-3-indole)-alkylamine. One method for the separation of the (benzyloxy-3-indole)-alkanoylamides from the oil involves the addition of an organic solvent, such as ether, chloroform, or benzene, with ether being preferred, to the oil, and hydrolysis of the mixture as with dilute acetic acid, whereupon the (benzyloxy-3-indole)-alkanoylamide separates from the mixture. Upon filtration the amide product may be recrystallized from alcohol to a greater degree of purity and may be converted to the amines as previously disclosed.

In the method of the present invention the (hydroxy-3-indole)-alkylamines are prepared by subjecting the (benzyloxy-3-indole)-alkylamines to hydrogenolysis in the presence of a catalyst which results in a debenzylation of the (benzyloxy-3-indole)-alkylamine. The debenzylation reaction may also result in the removal of the benzyl radical from the amino group to produce a secondary or primary amino group. The amino group may be re-benzylated, if so desired, by various well known procedures, e. g., benzaldehyde may be added to the debenzylated solution and the mixture refluxed for a short time, whereafter the solution may be hydrogenated in the presence of a platinum oxide catalyst, resulting in a benzylamino group. In the hydrogenolysis reaction the hydrogen pressure employed may range from slightly under atmospheric to about two or three atmospheres, although higher pressures can also be used. The hydrogenolysis is usually carried out at the temperature of about 25 degrees centigrade (room temperature), but the reaction can also be conducted satisfactorily in a temperature range between about zero degrees centigrade and the boiling point of the solvent employed. The reaction is completed in a period of a few minutes to several hours, with a shorter reaction time, of course, being required at the higher temperatures and greater pressures. Catalysts which may be employed in the reaction include among others palladium black, palladium-barium sulfate, palladium-charcoal, and the like, with a ten percent palladium-charcoal catalyst being preferred.

Other concentrations between about one and fifty percent may also be employed, with a somewhat shorter reaction time being required at the higher concentrations. Organic solvents suitable for the hydrogenolysis include, among others, lower-aliphatic ketones, such as acetone, and alkanols, such as methanol, ethanol, and isopropanol, with ethanol being preferred. The desired (hydroxy-3-indole)-alkylamine can be isolated at this point by filtering to remove the catalyst, concentrating, and evaporating the solvent employed. The isolated (hydroxy-3-indole)-alkylamine is obtained as a non-crystalline, water-insoluble oil which may be readily converted to a more convenient acid addition salt by reaction with a stoichiometric quantity of acid such as hydrochloric, picric, tartaric, citric, acetic, sulfuric, and the like, or by the addition of sulfuric acid and a stoichiometric quantity of creatinine sulfate. Similarly a quaternary ammonium salt may also be prepared by heating the isolated tertiary amine free base in a pressure bottle with an alkyl halide or aralkyl halide, and such quaternary ammonium salts include the methochloride, ethobromide, benzyl chloride, and the like. The resulting (hydroxy-3-indole)-alkylamine salt solution may then be filtered, the filtrate heated, and the (hydroxy-3-indole)-alkylamine salt precipitated therefrom by the addition of an appropriate precipitating agent for the particular desired salt, such as a lower aliphatic ketone, e. g., acetone, diethyl ketone, methyl-isopropyl ketone, methyl-isobutyl ketone, and the like, with acetone as the preferred reagent, to an aqueous solution of serotonin creatinine sulfate; lower-alkyl ethers such as dimethyl, diethyl, methyl-n-butyl, methyl-ethyl, and the like, with diethyl ether being preferred, to an alcoholic solution of serotonin sulfate, hydrochloride, acetate, tartrate, or citrate; the addition of water to an alcoholic solution of serotonin picrate; or by the addition of ether to an alcoholic solution of the quaternary ammonium salt. Lower alkanols such as methanol, ethanol, propanol, isopropanol, butanol, and the like are usually employed as solvents in the precipitation of the picrate, sulfate, hydrochloride, acetate, tartrate, and citrate acid addition salts. Alternatively, the addition salts may be prepared by treating the (hydroxy-3-indole)-alkylamines, without isolation from the reaction mixture, with a stoichiometric quantity of the above-mentioned acids, or with the addition of sulfuric acid and creatinine sulfate, or by the addition of an alkyl or aralkyl halide to the non-isolated tertiary amine free base. An additional alternative procedure for the preparation of the (hydroxy-3-indole)-alkylamine salts involves the direct debenzylation of an alcoholic solution of a (benzyloxy-3-indole)-alkylamine salt in the presence of the catalyst and hydrogen whereafter the (hydroxy-3-indole)-alkylamine salts are precipitated by the addition of the proper precipitating agent as outlined above. The hydrogenolysis of the (benzyloxy-3-indole)-alkylamines may also be accomplished by reaction with sodium and liquid ammonia, conducted at the boiling point of the liquid ammonia, wherein nascent hydrogen is liberated for the desired hydrogenolysis, but the catalytic procedure is preferred.

The 5-hydroxytryptamines, i. e., serotonin, the primary amine, can also be prepared in an alternative procedure. In the alternative procedure serotonin is prepared by the debenzylation of a 5-benzyloxytryptamine by the procedure described above. The 5-benzyloxytryptamines are prepared, as disclosed in my copending application Serial Number 260,315, filed December 6, 1951, by reduction of the corresponding 5-benzyloxy-3-indoleacetonitriles. The 5-benzyloxyindoleacetonitriles are prepared, as disclosed in my copending application Serial Number 257,961, filed November 23, 1951, by a treatment of known 5-benzyloxyindoles as more fully disclosed hereinafter.

The 5-benzyloxyindoleacetonitriles are prepared by reacting a 5-benzyloxyindolemagnesium halide, prepared as described above for the amide process, with a haloacetonitrile, such as chloroacetonitrile, bromoacetonitrile, or iodoacetonitrile, with chloroacetonitrile being preferred, to produce a 5-benzyloxy-3-indoleacetonitrile. The same organic solvent as employed in the Grignard step is usually utilized in the reaction with haloacetonitrile although others may be used if desired. The temperature range for the reaction of the haloacetonitrile and the 5-benzyloxyindolemagnesium halide is usually between about zero and 100 degrees centigrade, with the reaction ordinarily being conducted at the boiling point of the solvent employed. After refluxing for a period of about one to five hours, the resulting 5-benzyloxy-3-indoleacetonitrile is separated by conventional procedure, which, for example, may involve a mild hydrolysis, as with dilute acetic acid, to form a water layer and an ether layer. The ether layer containing the 5-benzyloxy-3-indoleacetonitrile can be separated and dried to give an ethereal solution of the 5-benzyloxy-3-indoleacetonitrile. From this solution the desired 5-benzyloxy-3-indoleacetonitrile can be obtained in high purity by evaporation of solvent removal according to other conventional procedure.

The reduction of the 5-benzyloxy-3-indoleacetonitrile is also identical to the lithium aluminum hydride reduction of the amide fully discussed above except that in the nitrile process ether is the preferred solvent.

The following examples will serve to illustrate the process of this invention, but the said invention is not to be considered as limited thereto.

PREPARATION 1.—α-3-(5-BENZYLOXYINDOLE)-N-BENZYL-N-METHYLACETAMIDE

To a Grignard reagent prepared from 4.25 grams (0.03 mole) of methyl iodide and 2.4 grams of magnesium in 200 milliliters of ether was added a solution of 5.5 grams (0.025 mole) of 5-benzyloxyindole in 200 milliliters of ether. After heating under reflux for thirty minutes, the mixture was cooled in an ice-bath and a solution of 5.9 grams (0.03 mole) of α-chloro-N-benzyl-N-methylacetamide in 200 milliliters of ether was added thereto. The mixture was stirred and the ether was removed by distillation, whereafter the reddish gummy residue was warmed for three hours on a steambath. The mixture was cooled and approximately 500 milliliters of ether was added, followed by the addition with vigorous stirring of a solution of five milliliters of glacial acetic acid and 95 milliliters of water. A light colored solid separated from solution, and after standing overnight the product was collected and recrystallized from isopropanol. The α - 3 - (5 - benzyloxyindole) - N - benzyl - N - methylacetamide melted at 151–152 degrees centigrade; yield, 7.5 grams (78 percent).

*Anal.*—Percent calc. for $C_{25}H_{24}O_2N_2$: C, 78.13; H, 6.29. Found: C, 78.26; H, 6.21.

Other representative 5-benzyloxyindoles which may be utilized in the procedure to prepare the 5-benzyloxyindolemagnesium halides include the 5-benzyloxy-2-alkylindoles, e. g., 5-benzyloxy-2-methylindole, 5-benzyloxy-2-ethylindole, and the like; 5-benzhydryloxyindole; 5-alkylbenzyloxyindoles e. g., 5-(para-methylbenzyloxy)-indole, 5 - (para,para′ - dimethylbenzhydryloxy) - indole, 5 - (para,para′ - diethylbenzhydryloxy) - 2 - ethylindole, and the like; 5-halobenzyloxyindoles, e. g., 5-(para - chlorobenzyloxy) - indole, 5 - (para,para′ - dichlorobenzhydryloxy) - indole, 5 - (para,para′ - dibromobenzhydryloxy)-2-methylindole, and the like; 5-alkoxybenzyloxyindoles, e. g., 5-(para-methoxybenzyloxy)-indole, 5 - (para, para′ - dimethoxybenzhydryloxy) - indole, 5-(para,para′ - diethoxybenzhydryloxy) - 2 - propylindole, and the like.

The preparation of the haloalkanoylamides utilized in the process of the present invention involves the addition of an acid halide to ether, cooling in an ice-bath, and adding thereto an amine with vigorous stirring whereupon a heavy precipitate forms and may be removed by filtration. The precipitate is usually washed with several portions of ether and the combined filtrate then distilled under vacuum to remove the solvent and produce the desirable haloalkanoylamide. Other representative haloalkanoylamides which can be employed to react with the chosen 5-benzyloxyindolemagnesium halide to produce the desired (5-benzyloxy-3-indole)-alkanolylamide include the α-haloacetamides such as the α-halo-N-alkyl-N-aralkylacetamides, e. g., α-chloro-N-methyl-N-benzylacetamide, α - chloro - N - benzyl - N - isopropylacetamide; α - halo - N,N - dialkylacetamides, e. g., α-chloro - N,N - dimethylacetamide, α - chloro - N,N-dibutylacetamide, α - iodo - N,N - diethylacetamide; α-halo - N,N - diaralkylacetamides, e. g., α - chloro-N,N - dibenzylacetamide; α - halo - N,N - dicycloalkylacetamides, e. g., α - chloro - N,N - dicyclohexylacetamide; α - halo - α - alkyl - N - alkyl - N - aralkylacetamides, e. g., α - chloro - α - methyl - N - methyl - N-benzylacetamide; α - halo - N - aralkyl - N - cycloalkylacetamides, e. g., α - chloro - N - benzyl - N - cyclohexylacetamide, α - bromo - N - phenethyl - N - cyclopentylacetamide; α - haloacetylpiperidides, e. g., α-chloroacetylpiperidide, and the β-halopropionamides, e. g., β-chloro-N,N-diethylpropionamide, β-chloro-β-methyl - N - methyl - N - benzylpropionamide, β - iodopropionylpiperidide, and the like.

PREPARATION 2.—5 - BENZYLOXY-3-[2-(N-BENZYL-N-METHYLAMINO)-ETHYL]-INDOLE AND SALTS THEREOF

A solution of 3.84 grams (0.01 mole) of α-3-(5-benzyloxyindole)-N-benzyl-N-methylacetamide, as obtained in Preparation 1, in 150 milliliters of tetrahydrofuran was added with stirring to a solution of 3.7 grams (0.10 mole) of lithium aluminum hydride in 200 milliliters of tetrahydrofuran. The mixture was heated under reflux for thirty minutes, concentrated to a volume of 75 milliliters, and diluted with 500 milliliters of ether followed by fifty milliliters of five percent sodium hydroxide solution. The ether layer was decanted and the aqueous alkaline residue was extracted with several 300-milliliter portions of ether. To the combined ether solutions of the free 5-benzyloxy-3-[2-(N-benzyl-N-methylamino)-ethyl]-indole was added dilute hydrochloric acid. A white solid separated which was filtered, washed with ether, and recrystallized from ethanol. The yield of 5 - benzyloxy - 3 - [2 - benzyl - N - methylamino) - ethyl]-indole hydrochloride melting at 110–112 degrees centigrade was 2.9 grams (71 percent).

Anal.—Percent calc. for $C_{25}H_{26}ON_2 \cdot HCl$: C, 73.79; H, 6.69. Found: C, 73.74; H, 6.69.

In a same manner the following representative (5-benzyloxy - 3 - indole) - alkylamines and salts may be prepared: 5 - benzyloxy - 3 - [2 - (N,N - dibenzylamino)-ethyl] - indole, 5 - benzyloxy - 3 -[2 - (N,N - dimethylamino) - ethyl - indole, 5 - benzyloxy - 3 - [2 - (1-piperidine) - ethyl] - indole, 5 - (para,para' - dimethylbenzhydryloxy) - 3 - [1 - methyl - 3 - (N,N - dibenzylamino) - propyl] - indole, 2 - ethyl - 5 - (para,para'-dichlorobenzhydryloxy) - 3 - [2 - (N - methyl - N - benzylamino) - ethyl] - indole, 5 - (para,para' - dimethoxybenzhydryloxy) - 3 - [3 - (N - methylamino) - propyl] - indole, 5 - benzhydryloxy - 3 - [2 - (N - benzylamino) - ethyl] - indole, 5 - benzyloxy - 3 - [3 - (N,N-diethylamino) - propyl] - indole, 5 - benzyloxy - 3 - [2-(N,N - dibutylamino) - ethyl] - indole, and the like Example 1.—5-hydroxy-3-[2-(N-methylamino)-ethyl]-indole and salts thereof To a suspension of 2.64 grams (0.0065 mole) of 5-benzyloxy-3-[2-(N-benzyl-N-methylamino)-ethyl]-indole hydrochloride in 100 milliliters of water was added 25 milliliters of ten percent sodium hydroxide solution followed by 200 milliliters of ether. The mixture was stirred vigorously until all suspended solid had dissolved, the ether layer was decanted, and the extraction was repeated with three additional 200-milliliter portions of ether. The ether extracts were combined, washed twice with water, dried over potassium carbonate, and the ether removed by distillation. The residue was dissolved in 25 milliliters of absolute ethanol, transferred to a microreduction flask and 0.5 gram of ten percent palladium-charcoal catalyst was added. The mixture was shaken with hydrogen at a pressure slightly greater than atmospheric and at a temperature of about 25 degrees centigrade. In about thirty minutes the hydrogen consumption was approximately 110 percent of theory. The reaction mixture was filtered to remove the catalyst and to the solution was added thirteen milliliters (0.0065 equivalent) of 0.5 N sulfuric acid. The solution was concentrated to a volume of about five milliliters and a solution of 1.13 grams (0.0035 mole) of creatinine sulfate (neutral salt) in ten milliliters of water was added thereto. The resulting pink solution was filtered through a sintered glass funnel and the flask and funnel were rinsed with water; the final volume of solution was thirty milliliters. The solution was heated to sixty degrees centigrade and eighty milliliters of acetone was added to it with stirring; a heavy buff precipitate of 5-hydroxy-3-[2 - (N - methylamino) - ethyl]-indole creatinine sulfate quickly separated. After filtering, drying, and recrystallizing from water-acetone, the product weighed 1.3 grams (fifty percent), and melted at 220–221 degrees centigrade.

Anal.—Percent calc. for $C_{15}H_{23}O_6N_5S$: C, 44.88; H, 5.77. Found: C, 45.02; H, 5.55.

In the same manner the following acid addition salts of the 5-hydroxy-3-[2-(N-methylamino)-ethyl]-indole are prepared by reacting the free base with the corresponding acid: hydrochloride, picrate, tartrate, citrate, acetate, and sulfate.

Example 2.—5-hydroxy-3-[2-(N,N-dimethylamino)-ethyl]-indole and salts thereof

In essentially the same manner as disclosed in Example 1, 5-hydroxy-3-[2-(N,N-dimethylamino)-ethyl]-indole is prepared by debenzylating 5-benzyloxy-3-[2-(N,N-dimethylamino)-ethyl]-indole, under a hydrogen pressure of two atmospheres, employing a palladium-charcoal catalyst. The 5 - hydroxy - 3-[2-(N,N-dimethylamino)-ethyl]-indole creatinine sulfate was obtained in fifty percent yield and melted at 141–143 degrees centigrade.

Anal.—Percent calc. for $C_{16}H_{25}O_6N_5S$: C, 44.33; H, 6.28; N, 16.16. Found: C, 44.88; H, 6.12; N, 16.17.

Example 3.—5-hydroxy-3-[2-(N-cyclohexylamino)-ethyl]-indole and salts thereof

In essentially the same manner as given in Example 1, 5-hydroxy-3-[2-(N-cyclohexylamino)-ethyl]-indole is prepared by debenzylating 5-benzyloxy-3-[2-(N-cyclohexylamino)-ethyl]-indole, under a hydrogen pressure of two atmospheres, employing a palladium-barium sulfate catalyst, and adding a stoichiometric quantity of hydrogen chloride thereto to prepare the 5-hydroxy-3-[2-(N-cyclohexylamino)-ethyl]-indole hydrochloride.

Example 4.—5-hydroxy-3-[2-(N-phyenyl-N-ethylamino)-ethyl]-indole and salts thereof In essentially the same manner as given in Example 1, 5-hydroxy-3-[2-(N-phenyl-N-ethylamino)-ethyl]-indole is prepared by debenzylating 5-benzyloxy-3-[2-(N-phenyl-N-ethylamino)-ethyl]-indole, under a hydrogen pressure of two atmospheres, employing a palladium-charcoal catalyst, and adding a stoichiometric quantity of picric acid thereto to prepare the 5-hydroxy-3-[2-(N-phenyl-N-ethylamino)-ethyl]-indole picrate, melting at 185–186 degrees centigrade.

*Example 5.—5-hydroxy-3-[2-(1-piperidine)-ethyl]-indole and salts thereof*

In essentially the same manner as given in Example 1, 5-hydroxy-3-[2-(1-piperidine)-ethyl]-indole is prepared by debenzylating 5-benzyloxy-3-[2-(1-piperidine)-ethyl]-indole under a hydrogen pressure of two atmospheres, employing a palladium-charcoal catalyst, and adding a stoichiometric quantity of hydrogen chloride thereto to prepare the 5-hydroxy-3-[2-(1-piperidine)-ethyl]-indole hydrochloride, melting at 246–248 degrees centigrade.

*Anal.*—Percent calc. for $C_{15}H_{21}N_2OCl$: C, 64.15; H, 7.53; N, 9.97. Found: C, 63.99; H, 7.67; N, 9.64.

In the same manner the following (5-hydroxy-3-indole)-alkylamines are prepared by subjecting the corresponding (5-benzyloxy-3-indole)-alkylamine to hydrogenolysis: 2 - ethyl-5-hydroxy-3-[2-(1-piperidine)-ethyl]-indole, 5 - hydroxy-3-[1-methyl-2-(1-piperidine)-ethyl]-indole, 5-hydroxy-3-[2-(4-morpholine)-ethyl]-indole, 5-hydroxy-3-[2-(1-pyrrolidine)-ethyl]indole, 5 - hydroxy-3-[2-(4-thiomorpholine)-ethyl]-indole, 5 - hydroxy - 3 - [3 - (1 - piperidine)-propyl]-indole, 5 - hydroxy - 3 - [1-ethyl-3-(1-piperidine)-propyl]-indole, and the like.

*Example 6.—5-hydroxy-3-[2-(N,N-dibutylamino)-ethyl]-indole and salts thereof*

In essentially the same manner as given in Example 1, 5-hydroxy-3-[2-(N,N-dibutylamino)-ethyl]-indole is prepared by debenzylating 5-benzyloxy-3-[2-(N,N-dibutylamino)-ethyl]-indole, under a hydrogen pressure of two atmospheres, employing a palladium-charcoal catalyst, and adding a stoichiometric quantity of hydrogen chloride thereto to prepare the 5-hydroxy-3-[2-(N,N-dibutylamino)-ethyl]-indole hydrochloride, melting at 213–214 degrees centigrade.

*Anal.*—Percent calc. for $C_{18}H_{29}N_2OCl$: C, 66.54; H, 8.93; N, 8.62. Found: C, 66.75; H, 8.98; N, 8.39.

*Example 7.—5-hydroxy-3-[3-(N-methylamino)-propyl]-indole and salts thereof*

In essentially the same manner as given in Example 1, 5-hydroxy-3-[3-(N-methylamino)-propyl]-indole is prepared by debenzylating 5-(para,para'-dimethoxybenzhydryloxy)-3-[3-(N-methylamino)-propyl]-indole, at atmospheric pressure in the presence of hydrogen, employing a palladium-charcoal catalyst, and adding a stoichiometric quantity of picric acid thereto to prepare the 5-hydroxy-3-[3-(N-methylamino)-propyl]-indole picrate.

In the same manner the following (5-hydroxy-3-indole)-alkylamines and salts thereof are prepared: 5-hydroxy-3-[2-(N,N-dicyclohexylamino)-ethyl]-indole, 5-hydroxy-3-[1-propyl-2-(N - ethyl - N - cyclohexylamino)-ethyl]-indole, 2-propyl - 5 - hydroxy-3-(2-aminoethyl)-indole, 5-hydroxy-3-(2-aminoethyl)-indole, 5-hydroxy-3-(1-ethyl-3-aminopropyl)-indole, and the like, by debenzylating the following (5-alkoxybenzyloxy-3-indole)-alkylamines, respectively: 5-(para-methoxybenzyloxy)-3-[2-(N,N - dicyclohexylamino) - ethyl - indole, 5-(para,-para'-dimethoxybenzhydryloxy)-3-[1-propyl - 2-(N-ethyl-N-cyclohexylamino) - ethyl] - indole, 2-propyl-5-(para-ethoxybenzyloxy)-3-[2-(N-benzylamino) - ethyl]-indole, 5-(para,para'-dimethoxybenzhydryloxy) - 3 - [2-(N,N-dibenzylamino)-ethyl]-indole, 5-(para-ethoxybenzyloxy)-3-[1-ethyl-3-(N-benzylamino)-propyl]-indole, and the like.

*Example 8.—2-ethyl-5-hydroxy-3-[2-(N - methylamino)-ethyl]-indole and salts thereof*

In essentially the same manner as given in Example 1, 2-ethyl-5-hydroxy-3-[2-(N-methylamino)-ethyl]-indole is prepared by debenzylating 2-ethyl-5-(para,para'-dichlorobenzhydryloxy)-3-[2-(N-methyl-N-benzylamino)- ethyl]-indole, under a hydrogen pressure of two atmospheres, employing a palladium black catalyst, and adding a stoichiometric quantity of sulfuric acid thereto to prepare the 2 - ethyl - 5 - hydroxy-3-[2-(N-methylamino)-ethyl]-indole sulfate.

In the same manner the following (5-hydroxy-3-indole)-alkylamines and salts thereof are prepared: 5-hydroxy-3-[2-(N,N-dicyclohexylamino)-ethyl]-indole, 5-hydroxy-3-[1-ethyl-2-(N-methylamino)-ethyl]-indole, 5-hydroxy-3-[3-(N-isopropylamino)-propyl]-indole, 5-hydroxy-3-[1-ethyl-3-(N-methylamino)-propyl]-indole, and the like, by debenzylating the following (5-halobenzyloxy-3-indole) - alkylamines respectively: 5-(para-iodobenzyloxy)-3-[2-(N,N-dicyclohexylamino)-ethyl]-indole, 5-(para,para'-dichlorobenzhydryloxy) - 3 - [1-ethyl-2-(N-methyl - N - benzylamino)-ethyl]-indole, 5-(para,para'-dichlorobenzhydryloxy)-3-[3 - (N - isopropylamino)-propyl]-indole, 5 - (para-bromobenzyloxy)-3-[1-ethyl-3-(N-methylamino)-propyl]-indole, and the like.

*Example 9.—5 - hydroxy - 3 - (1-methyl-3-aminopropyl)-indole and salts thereof*

In essentially the same manner as given in Example 1, 5-hydroxy-3-(1-methyl-3-aminopropyl) - indole is prepared by debenzylating 5-(para,para'-dimethylbenzhydryloxy)-3-[1-(methyl-3-(N,N-dibenzylamino) - propyl]-indole, under a slight sub-atmospheric pressure of hydrogen, employing a palladium-barium sulfate catalyst, and adding a stoichiometric quantity of sulfuric acid and creatinine sulfate thereto to prepare the 5-hydroxy-3-(1-methyl-3-aminopropyl)-indole creatinine sulfate.

In the same manner the following (5-hydroxy-3-indole)-alkylamines and salts thereof are prepared: 5-hydroxy-3-(2-aminoethyl) - indole, 5-hydroxy-3-[2-(N-isopropylamino)-ethyl]-indole, 2-methyl-5-hydroxy-3-[2-(N-phenylamino)-ethyl] - indole, 5-hydroxy-3-(3-aminopropyl)-indole, and the like, by debenzylating the following (5-alkylbenzyloxy-3-indole)-alkylamines, respectively: 5 - (para - methylbenzyloxy) - 3 - [2 - (N - benzylamino)-ethyl]-indole, 5-(para-propylbenzyloxy) - 3 - [2-(N-isopropyl-N-benzylamino)-ethyl]-indole, 2-methyl-5-(para-ethylbenzyloxy)-3-[2 - (N - phenylamino) - ethyl]-indole, 5 - (para-ethylbenzyloxy)-3-[3-(N-benzylamino)-propyl]-indole and the like.

*Example 10.—5-hydroxy - 3 - (2-aminoethyl)-indole and salts thereof*

In essentially the same manner as given in Example 1, 5-hydroxy-3-(2-aminoethyl)-indole is prepared by debenzylating 5 - benzhydryloxy - 3 - [2-(N-benzylamino)-ethyl]-indole, under a hydrogen pressure of two atmospheres, employing a palladium-barium sulfate catalyst, and adding a stoichiometric quantity of hydrogen chloride thereto to prepare the 5-hydroxy-3-(2-aminoethyl)-indole hydrochloride.

In the same manner the following (5-hydroxy-3-indole)-alkylamines and salts thereof are prepared: 5-hydroxy-3-[2-(N - cyclopentyl - N-ethylamino)-ethyl]-indole, 5-hydroxy-3-[1-ethyl - 2 - (N,N-diphenylamino)-ethyl]-indole, 2-methyl - 5 - hydroxy - 3 - [2-(N-methylamino)-ethyl]-indole, 5-hydroxy-3-[3-(N-methylamino)-propyl]-indole, 5-hydroxy - 3 - [1-ethyl - 3 - (N-methylamino)-propyl]-indole, and the like, by debenzylating the following (5-benzhydryloxy-3-indole)-alkylamines respectively: 5-benzhydryloxy - 3 - [2 - (N - cyclopentyl-N-ethylamino)-ethyl]-indole, 5-benzhydryloxy-3-[1-ethyl-2-(N,N-diphenylamino)-ethyl]-indole, 2-methyl-5-benzhydryloxy-3-[2-(N-benzyl-N-methylamino) - ethyl]-indole, 5-benzhydryloxy-3-[3-(N-methyl - N - benzylamino)-propyl]-indole, 5-benzhydryloxy-3-[1-ethyl-3-(N-methylamino)-propyl]-indole, and the like.

*Example 11.—2 - methyl-5-hydroxy-3-(2-aminoethyl)-indole and salts thereof*

In essentially the same manner as given in Example 1, 2-methyl-5-hydroxy-3-(2-aminoethyl)-indole is prepared by debenzylating 2-methyl-5-benzyloxy-3-[2-(N,N-dibenzylamino)-ethyl]-indole, under a hydrogen pressure of two atmospheres, employing a palladium-charcoal catalyst, and adding a stoichiometric quantity of picric acid thereto to prepare the 2-methyl-5-hydroxy-3-(2-aminoethyl)-indole picrate, melting at 223–225 degrees centigrade.

*Anal.*—Percent calc. for $C_{17}H_{17}N_5O_8$: C, 48.64; H, 4.08; N, 16.70. Found: C, 48.60; H, 4.10; N, 16.33.

In the same manner the 2-methyl-5-hydroxy-3-(2-aminoethyl)-indole hydrochloride, melting at 225.5–227 degrees centigrade, is prepared by reacting hydrochloric acid with the 2-methyl-5-hydroxy-3-(2-aminoethyl)-indole.

PREPARATION 1.—5-BENZYLOXY-3-INDOLEACETONITRILE

To a Grignard reagent prepared from 4.25 grams (0.03 mole) of methyl iodide and 2.0 grams of magnesium in 200 milliliters of ether was added a solution of 5.5 grams (0.025 mole) of 5-benzyloxyindole in 200 milliliters of ether. After heating under reflux for thirty minutes, the mixture was cooled in an ice-bath and to it was added a solution of three grams (0.04 mole) of freshly distilled chloroacetonitrile in 100 milliliters of ether. The mixture was heated vigorously under reflux for two and one-half hours, cooled and hydrolyzed by the addition of a solution of ten milliliters of glacial acetic acid and ninety milliliters of water. The ether layer was separated and the aqueous layer was extracted with several portions of ether. The combined ether solutions were washed successively with water, sodium carbonate solution and water, and dried over potassium carbonate for at least 24 hours to give an ethereal solution of 5-benzyloxy-3-indoleacetonitrile from which the desired 5-benzyloxy-3-indoleacetonitrile is obtained by evaporation or other conventional procedure.

Other representative 5-benzyloxy-3-indoleacetonitriles which may be prepared in essentially the same manner, by using the appropriate 5-benzyloxyindole, are 5-alkylbenzyloxy-3-indoleacetonitriles, e. g., 5-(para-methylbenzyloxy)-3-indoleacetonitrile, 5 - (para-propylbenzyloxy)-3-indoleacetonitrile, 5-(meta-isopropylbenzyloxy)-3-indoleacetonitrile, and the like; 5-aralkylbenzyloxy-3-indoleacetonitriles, e. g., 5-(para-benzylbenzyloxy)-3-indoleacetonitrile, 5 - (para - phenylpropylbenzyloxy)-3-indoleacetonitrile, and the like; 5-cycloalkylbenzyloxy-3-indoleacetonitriles, e. g., 5-(para-cyclohexylbenzyloxy)-3-indoleacetonitrile, 5 - (meta - cyclopentylbenzyloxy)-3-indoleacetonitrile, and the like; 5-alkoxybenzyloxy-3-indoleacetonitriles, e. g., 5-(para-methoxybenzyloxy)-3-indoleacetonitrile, 5-(para-propoxybenzyloxy)-3-indoleacetonitrile, and the like; 5-halobenzyloxy-3-indoleacetonitriles, e. g., 5-(meta-bromobenzyloxy)-3-indoleacetonitrile, 5-(para-iodobenzyloxy)-3-indoleacetonitrile, and the like; 5 - benzhydryloxy-3-indoleacetonitrile; 5 - ($\alpha$-alkylbenzyloxy)-3-indoleacetonitriles, e. g., 5-($\alpha$-methylbenzyloxy)-3-indoleacetonitrile, 5-($\alpha$-octylbenzyloxy)-3-indoleacetonitrile, and the like; 5-($\alpha$-cycloalkylbenzyloxy)-3-indoleacetonitriles, e. g., 5 - ($\alpha$ - cyclobutylbenzyloxy)-3-indoleacetonitrile, 5 - ($\alpha$ - cyclohexylbenzyloxy)-3-indoleacetonitrile, 5-($\alpha$-cyclopentylbenzyloxy)-3-indoleacetonitrile, and the like; 5-halobenzhydryloxy-3-indoleacetonitriles, e. g., 5-(para-iodobenzhydryloxy)-3-indoleacetonitrile, 5-(para-bromobenzhydryloxy)-3-indoleacetonitrile, 5-para,para'-dibromobenzhydryloxy) - 3 - indoleacetonitrile, 5-para,para'-dichlorobenzhydryloxy)-3-indoleacetonitrile, and the like; 5-($\alpha$-alkylalkylbenzyloxy)-3-indoleacetonitriles; e. g., 5-($\alpha$-methyl-para-methylbenzyloxy)-3-indoleacetonitrile, 5-($\alpha$-hexyl - para-methylbenzyloxy)-3-indoleacetonitrile, and the like; 5-($\alpha$-cycloalkylhalobenzyloxy)-3-indoleacetonitriles, e. g., 5-($\alpha$-cyclohexyl-para-bromobenzyloxy)-3-indoleacetonitrile, and the like; 5-(dialkylbenzhydryloxy)-3-indoleacetonitriles, e. g., 5-(para,para' - dimethylbenzhydryloxy) - 3 - indoleacetonitrile, 5 - (para,para' - dihexylbenzhydryloxy)-3-indoleacetonitrile, 5-(meta,meta'-diethylbenzhydryloxy) - 3 - indoleacetonitrile, and the like; 5-(dialkoxybenzhydryloxy)-3-indoleacetonitriles, e. g., 5-(para,para'-dimethoxybenzhydryloxy)-3-indoleacetonitrile, 5-(para,para' - diethoxybenzhydryloxy) - 3 - indoleacetonitrile, 5-(para,para'-dihexoxybenzhydryloxy)-3-indoleacetonitrile, and the like; 5-(dicycloalkylbenzhydryloxy)-3-indoleacetonitriles, e. g., 5-(meta,meta'-dicyclopentylbenzhydryloxy) - 3 - indoleacetonitrile, 5-(para,para'-dicyclopentylbenzhydryloxy)-3-indoleacetonitrile, 5-(para,para' - dicyclohexylbenzhydryloxy)-3-indoleacetonitrile, and the like; 5-(diaralkylbenzhydryloxy)-3-indoleacetonitriles, e. g., 5-(para,para'-dibenzylbenzhydryloxy)-3-indoleacetonitrile, and the like.

PREPARATION 2.—5-BENZYLOXYTRYPTAMINE AND ACID ADDITION SALTS THEREOF

An ether solution of 5-benzyloxy-3-indoleacetonitrile, obtained as in the above preparation, was added to a solution of 3.7 grams (0.1 mole) of lithium aluminum hydride in 400 milliliters of anhydrous ether. The mixture was heated under reflux for one hour and hydrolyzed by the addition of 500 milliliters of ether saturated with water followed by fifty milliliters of five percent aqueous sodium hydroxide solution. The ether layer was decanted and the aqueous alkaline residue was extracted with several 300-milliliter portions of ether. The ether solutions of the free 5-benzyloxytryptamine were combined and washed with dilute aqueous sodium hydroxide solution and with water, whereafter the free 5-benzyloxytryptamine was shaken with an equimolecular portion of five percent hydrochloric acid. A crystalline precipitate of 5-benzyloxytryptamine hydrochloride separated and was removed by filtration; yield 3.3 grams (44 percent based on 5-benzyloxyindole). After two recrystallizations from ethanol-water, the 5-benzyloxytryptamine hydrochloride melted at 248–250 degrees centigrade with decomposition.

*Analysis.*—Calculated for $C_{17}H_{19}ClN_2O$: C, 67.42; H, 6.32; Cl, 11.71; N, 9.20. Found: C, 67.26; H, 6.34; Cl, 11.78; N. 9.20.

Other representative 5-benzyloxytryptamines and their acid addition salts which may be prepared in essentially the same manner, by using the appropriate 5-benzyloxy-3-indoleacetonitrile, are 5-alkylbenzyloxytryptamines, e. g., 5-(para-methylbenzyloxy)-tryptamine, 5-(meta-ethylbenzyloxy)-tryptamine, 5-(ortho - butylbenzyloxy)-tryptamine, and the like; 5-aralkylbenzyloxytryptamines, e. g. 5-(para - benzylbenzyloxy) - tryptamine, 5-(para-phenylpropylbenzyloxy)-tryptamine, and the like; 5-cycloalkylbenzyloxy-tryptamines, e. g., 5-(para-cyclohexylbenzyloxy)-tryptamine, 5-(para - cyclopentylbenzyloxy)-tryptamine, 5-(meta - cyclohexylbenzyloxy)-tryptamine, and the like; 5-alkoxybenzyloxytryptamines, e. g., 5-(para-methoxybenzyloxy)-tryptamine, 5-(para - ethoxybenzyloxy)-tryptamine, and the like; 5-halobenzyloxytryptamines, e. g., 5-(para-chlorobenzyloxy)-tryptamine, 5-(para-iodobenzyloxy)-tryptamine, and the like; 5-benzhydryloxytryptamine; 5-($\alpha$-alkylbenzyloxy)-tryptamines, e. g., 5 - ($\alpha$ - methylbenzyloxy) - tryptamine, 5 - ($\alpha$ - propylbenzyloxy)-tryptamine, and the like; 5-($\alpha$-cycloalkylbenzyloxy)-tryptamines, e. g., 5-($\alpha$-cyclohexylbenzyloxy)-tryptamine, 5-($\alpha$-cyclopentylbenzyloxy)-tryptamine, and the like; 5-halobenzhydryloxytryptamines, e. g., 5-(para-chlorobenzhydryloxy)-tryptamine, 5-(para-bromobenzhydryloxy)-tryptamine, 5-(para, para'-dichlorobenzhydryloxy)-tryptamine, 5-(para,para'-dibromobenzhydryloxy)-tryptamine, and the like; 5-($\alpha$-alkyl-alkylbenzyloxy)-tryptamines, e. g., 5-($\alpha$-methyl-para-methylbenzyloxy)-tryptamine, 5-($\alpha$-ethyl - para - methylbenzyloxy)-tryptamine, and the like; 5 - (cycloalkylhalobenzyloxy)-tryptamines, e. g., 5-($\alpha$-cyclopentyl-para-chlorobenzyloxy)-tryptamine, and the like; 5-(dialkylbenzhydryloxy)-tryptamines, e. g., 5-(para,para'-dimethylbenzhydrloxy)-tryptamine, 5-(para,para'-dibutylbenzhydryloxy) - tryptamine, and the like; 5-(dialkoxybenzhydryloxy)-tryptamines, e. g., 5-(para,para'-dimethoxybenzhydryloxy)-tryptamine, 5 - (para,para' - diethoxybenzhydryloxy)-tryptamine, and the like; 5-(dicycloalkylbenzhydryloxy)- tryptamines, e. g., 5-para,para'-dicyclopentylbenzhydryloxy)-tryptamine, 5-(para,para' - dicyclohexylbenzhydryloxy)-tryptamine, and the like, 5-(diaralkylbenzhydryloxy)-tryptamine, e. g., 5-(para,para'-dibenzylbenzhydryloxy)-tryptamine, 5-(para,para' - diphenethylbenzhydryloxy)-tryptamine, and the like.

*Example 1.—Serotonin and creatinine sulfate salt thereof*

To a suspension of two grams (0.0065 mole) of 5-benzyloxy-tryptamine hydrochloride in 100 milliliters of water was added 25 milliliters of ten percent sodium hydroxide solution followed by 200 milliliters of ether. The mixture was stirred vigorously until all suspended solids had dissolved, whereafter the ether layer was decanted and the extraction was repeated with three additional 200-milliliter portions of ether. The ether extracts were combined, washed twice with water and dried over potassium carbonate. The ether was removed by distillation and the residue was dissolved in 25 milliliters of absolute ethanol, transferred to a micro-reduction flask and 0.5 gram of ten percent palladium-charcoal catalyst was added thereto. The mixture was shaken with hydrogen at a pressure slightly greater than atmospheric and at a temperature of about 25 degrees centigrade. In about thirty minutes the hydrogen consumption was approximately 110 percent of theory. The reaction mixture was filtered to remove the catalyst and the resulting ethanol solution of free serotonin mixed with thirteen milliliters (0.0065 equivalent) of 0.5 N sulfuric acid. The solution was concentrated to a volume of about five milliliters and a solution of 1.13 grams (0.0035 mole) of creatinine sulfate (neutral salt) in ten milliliters of water was added thereto, resulting in the formation of serotonin creatinine sulfate acid addition salt as in the following reaction:

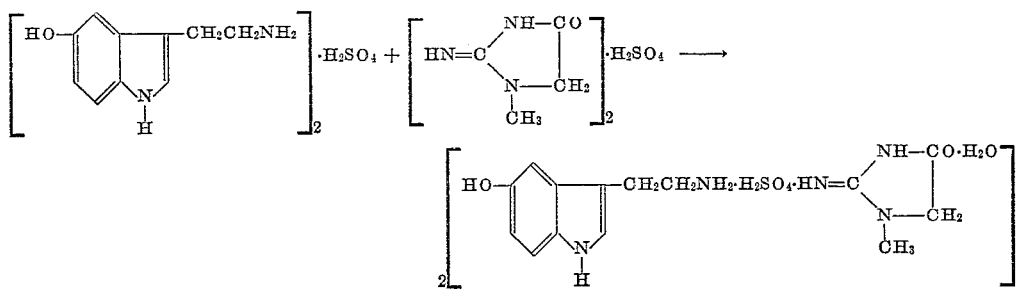

The resulting pink solution was filtered through a sintered glass funnel and the flask and funnel were rinsed with water, the final volume of the solution being thirty milliliters. The solution was heated to sixty degrees centigrade and eighty milliliters of acetone was added thereto with stirring, whereupon a heavy buff precipitate of serotonin creatinine sulfate quickly separated. After filtering and drying, the product weighed two grams (77 percent of theoretical) and melted at 214–215.5 degrees centigrade. After recrystallization from water-acetone, the melting point of the serotonin creatinine sulfate was 215–216 degrees centigrade.

*Anal.*—Calc. for $C_{14}H_{21}O_6N_5S \cdot H_2O$: C, 41.47; H, 5.72; N, 17.28. Found: C, 41.57; H, 5.52; N, 17.45.

In the same manner as disclosed in the above example, serotonin, serotonin creatinine sulfate, and serotonin acid addition salts are prepared by debenzylating other 5-benzyloxy-tryptamines wherein the 5-position benzyloxy substituent includes the benzyloxy substituents disclosed in the earlier discussed amide process.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. In a process for the preparation of (hydroxy-3-indole)-alkylamines including salts thereof, the step of debenzylating a (benzyloxy-3-indole)-alkylamine having the formula:

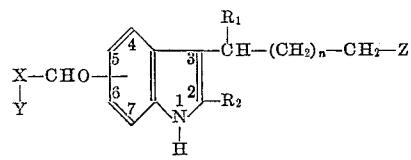

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, $R_1$ and $R_2$ are selected from the group consisting of hydrogen and lower alkyl, n is selected from the group consisting of zero and one, and Z is selected from the group consisting of secondary and tertiary amino radicals, with a debenzylating agent to produce a (hydroxy-3-indole)-alkylamine.

2. In a process for the preparation of a (hydroxy-3-indole)-alkylamine, the step of debenzylating a (benzyloxy-3-indole)-alkylamine having the formula:

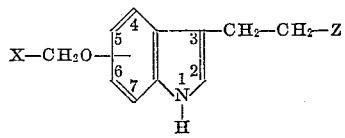

wherein X is phenyl and Z is a tertiary amino radical by the action of hydrogen in the presence of a palladium catalyst.

3. In a process for the preparation of a (5-hydroxy-3-indole)-alkylamine including salts thereof, the step of debenzylating a (5-benzyloxy-3-indole)-alkylamine having the formula:

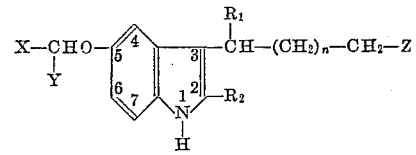

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, $R_1$ and $R_2$ are selected from the group consisting of hydrogen and lower alkyl, n is selected from the group consisting of zero and one, and Z is selected from the group consisting of secondary and tertiary amino radicals, by the action of hydrogen in the presence of a palladium catalyst.

4. In a process for the preparation of a (hydroxy-3- indole)-alkylamine, the step of debenzylating a (benzyloxy-3-indole)-alkylamine having the formula:

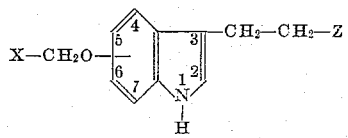

wherein X is phenyl and Z is a secondary amino radical by the action of hydrogen in the presence of a palladium catalyst.

5. In a process for the preparation of (hydroxy-3-indole)-alkylamines including salts thereof, the steps of reducing the carbonyl group of a (benzyloxy-3-indole)-alkanoylamide having the formula:

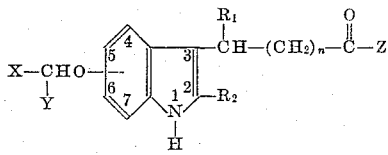

wherein X is selected from the group consisting of phenyl, holaphenyl, lower alkoxyphenyl, and lower alkylphenyl, Y is selected from the group consisting of hydrogen, phenyl, halophenyl, lower alkoxyphenyl, and lower alkylphenyl, $R_1$ and $R_2$ are selected from the group consisting of hydrogen and lower alkyl, $n$ is selected from the group consisting of zero and one, and Z is selected from the group consisting of secondary and tertiary amido radicals, to a methylene group, to produce the corresponding (benzyloxy-3-indole)-alkylamine, and debenzylating the thus-produced (benzyloxy-3-indole)-alkylamine to produce a (hydroxy-3-indole)-alkylamine.

6. In a process for the preparation of (hydroxy-3-indole)-alkylamines including salts thereof, the steps of reducing the carbonyl group of a (benzyloxy-3-indole)-alkanoylamide having the formula:

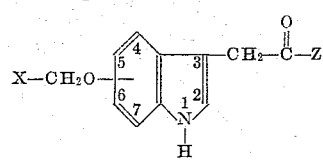

wherein X is phenyl and Z is a tertiary amido radical, to a methylene group, to produce the corresponding (benzyloxy-3-indole)-alkylamine, and catalytically debenzylating the thus-produced (benzyloxy-3-indole)-alkylamine to produce a (hydroxy-3-indole)-alkylamine.

7. In a process for the preparation of (hydroxy-3-indole)-alkylamines including salts thereof, the steps of reducing the carbonyl group of a (benzyloxy-4-indole)-alkanoylamide having the formula:

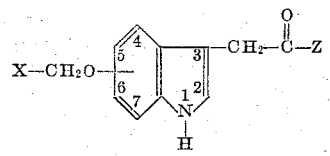

wherein X is phenyl and Z is a secondary amido radical, to a methylene group, to produce the corresponding (benzyloxy 3-indole)-alkylamine, and catalytically debenzylating the thus-produced (benzyloxy-3-indole)-alkylamine to produce a (hydroxy-3-indole)-alkylamine.

8. In a process for the preparation of (hydroxy-3-indole)-alkylamines including salts thereof, the steps of mixing a benzyloxy-indole having the formula:

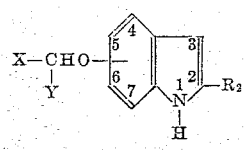

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and $R_2$ is selected from the group consisting of hydrogen and lower alkyl, with a Grignard reagent, reacting the thus-produced benzyloxyindolemagnesium halide with a haloalkanoylamide selected from the group consisting of α-haloacetamides and β-halopropionamides to produce a (benzyloxy-3-indole)-alkanoylamide, reducing the carbonyl group of the (benzyloxy-3-indole)-alkanoylamide to a methylene group, and debenzylating the thus-produced (benzyloxy-3-indole)-alkylamine to produce a (hydroxy-3-indole)-alkylamine.

9. In a process for the preparation of (hydroxy-3-indole)-alkylamines including salts thereof, the steps of mixing a benzyloxyindole having the formula:

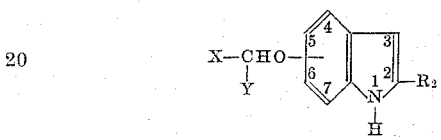

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and $R_2$ is selected from the group consisting of hydrogen and lower alkyl, with a Grignard reagent, reacting the thus-produced benzyloxyindolemagnesium halide with an α-haloacetamide to produce a (benzyloxy-3-indole)-alkanoylamide, reducing the carbonyl group of the (benzyloxy - 3 - indole) - alkanoylamide to a methylene group, and catalytically debenzylating the thus-produced (benzyloxy-3-indole)-alkylamine to produce a (hydroxy-3-indole)-alkylamine.

10. In a process for the preparation of (5-hydroxy-3-indole)-alkylamines including salts thereof, the steps of reducing the carbonyl group of a (5-benzyloxy-3-indole)-alkanoylamide having the formula:

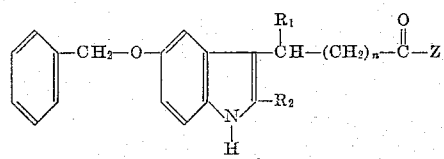

wherein $R_1$ and $R_2$ are selected from the group consisting of hydrogen and lower-alkyl, $n$ is selected from the group consisting of zero and one, and Z is selected from the group consisting of secondary and tertiary amido radicals, to a methylene radical, to produce the corresponding (5-benzyloxy-3-indole)-alkylamine, and debenzylating the thus-produced (5-benzyloxy-3-indole)-alkylamine to produce a (5-hydroxy-3-indole)-alkylamine.

11. In a process for the preparation of (5-hydroxy-3-indole)-alkylamines including salts thereof, the steps of mixing a 5-benzyloxyindole having the formula:

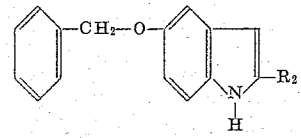

wherein $R_2$ is selected from the group consisting of hydrogen and lower-alkyl, with a Grignard reagent, reacting the thus-produced 5-benzyloxyindolemagnesium halide with an α-haloacetamide to produce a (5-benzyloxy-3-indole)-alkanoylamide, reducing the carbonyl group of the (5-benzyloxy-3-indole)-alkanoylamide to a methylene group, and catalytically debenzylating the thus-produced (5-benzyloxy-3-indole)-alkylamine to produce a (5-hydroxy-3-indole)-alkylamine.

12. In a process for the preparation of 5-hydroxy-3-(2-aminoethyl)-indole, the step of debenzylating 5-benzyloxy-3-[2-(N,N-dibenzylamino)-ethyl]-indole by the action of hydrogen in the presence of a palladium catalyst.

13. In a process for the preparation of 5-hydroxytryptamine and addition salts thereof, the step of debenzylating a compound selected from 5-benzyloxytryptamine and acid addition salts thereof by reacting a 5-benzyloxytryptamine with a debenzylating agent to produce a 5-hydroxytryptamine.

14. In a process for the preparation of 5-hydroxytryptamine and addition salts thereof, the step of catalytically debenzylating a compound selected from 5-benzyloxytryptamine and acid addition salts thereof in the presence of hydrogen to produce 5-hydroxytryptamine.

15. In a process for the preparation of 5-hydroxytryptamine and addition salts thereof, the step of debenzylating a compound selected from 5-benzyloxytryptamine and acid addition salts thereof to produce 5-hydroxytryptamine by the action of hydrogen in the presence of a palladium catalyst.

16. In a process for the preparation of 5-hydroxytryptamine and addition salts thereof, the step of debenzylating 5-benzyloxytryptamine to produce 5-hydroxytryptamine by the action of hydrogen in the presence of a palladium catalyst.

17. In a process for the preparation of 5-hydroxytryptamine and addition salts thereof, the steps of reducing the nitrile group of a 5-benzyloxy-3-indoleacetonitrile to an amine group with a reducing agent selected from the group consisting of metal hydrides and hydrogen in the presence of a hydrogenation catalyst, and catalytically debenzylating the thus-formed 5-benzyloxytryptamine in the presence of hydrogen to produce 5-hydroxytryptamine.

18. In a process for the preparation of 5-hydroxytryptamine and addition salts thereof, the steps of reducing the nitrile group of 5-benzyloxy-3-indoleacetonitrile to an amine group with a reducing agent selected from the group consisting of metal hydrides and hydrogen in the presence of a hydrogenation catalyst, and catalytically debenzylating the thus-formed 5-benzyloxytryptamine in the presence of hydrogen to produce 5-hydroxytryptamine.

19. In a process for the preparation of 5-hydroxytryptamine and addition salts thereof, the steps of converting a 5-benzyloxyindole to a 5-benzyloxy-3-indoleacetonitrile by mixing said 5-benzyloxyindole with a Grignard reagent, reacting the thus-produced 5-benzyloxyindolemagnesium halide with a haloacetonitrile to prepare a 5-benzyloxy-3-indoleacetonitrile, reducing the nitrile group of the 5-benzyloxy-3-indoleacetonitrile with a reducing agent selected from the group consisting of metal hydrides and hydrogen in the presence of a hydrogenation catalyst to prepare a 5-benzyloxytryptamine, and catalytically debenzylating the 5-benzyloxytryptamine in the presence of hydrogen to produce 5-hydroxytryptamine.

20. In a process for the preparation of 5-hydroxytryptamine and addition salts thereof, the steps of converting 5-benzyloxyindole to 5-benzyloxy-3-indoleacetonitrile by mixing said 5-benzyloxyindole with a Grignard reagent, reacting the thus-produced 5-benzyloxyindolemagnesium halide with a haloacetonitrile to prepare a 5-benzyloxy-3-indoleacetonitrile, reducing the nitrile group of the 5-benzyloxy-3-indoleacetonitrile with a reducing agent selected from the group consisting of metal hydrides and hydrogen in the presence of a hydrogenation catalyst to prepare 5-benzyloxytryptamine, and catalytically debenzylating the 5-benzyloxytryptamine in the presence of hydrogen to produce 5-hydroxytryptamine.

21. In a process for the preparation of (hydroxy-3-indole)-alkylamines including salts thereof, the step of debenzylating a (benzyloxy-3-indole)-alkylamine having the formula

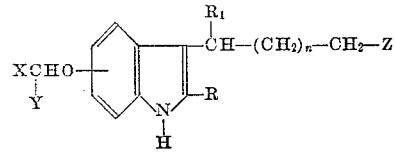

wherein X is selected from the group consisting of phenyl, halophenyl, lower alkoxyphenyl, and lower alkylphenyl, Y is selected from the group consisting of hydrogen, phenyl, halophenyl, lower alkoxyphenyl and lower alkylphenyl, $R_1$ and R are selected from the group consisting of hydrogen and lower alkyl, $n$ is selected from the group consisting of zero and one, and Z is an amino radical, with a debenzylating agent to produce a (hydroxy-3-indole)-alkylamine.

22. In a process for the preparation of (hydroxy-3-indole)-alkylamines including salts thereof, the steps of reducing a compound selected from the group consisting of 5-benzyloxy-3-indoleacetonitriles and (benzyloxy-3-indole)-alkanoylamides with a reducing agent selected from the group consisting of metal hydrides and hydrogen in the presence of a hydrogenation catalyst to prepare a (benzyloxy-3-indole)-alkylamine, and catalytically debenzylating the (benzyloxy-3-indole)-alkylamine in the presence of hydrogen to produce a (hydroxy-3-indole)-alkylamine.

23. In a process for the preparation of (hydroxy-3-indole)-alkylamines including salts thereof, the steps of mixing a benzyloxyindole having the formula:

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and R is selected from the group consisting of hydrogen and lower alkyl, with a Grignard reagent, reacting the thus-produced benzyloxyindolemagnesium halide with a compound selected from the group consisting of a haloalkanoylamide and a haloacetonitrile to produce a compound selected from the group consisting of a (benzyloxy-3-indole)-alkanoylamide and a 5-benzyloxy-3-indoleacetonitrile, reducing the thus-produced compounds with a reducing agent selected from the group consisting of metal hydrides and hydrogen in the presence of a hydrogenation catalyst to prepare a (benzyloxy-3-indole)-alkylamine, and catalytically debenzylating the (benzyloxy-3-indole)-alkylamine in the presence of hydrogen to produce a (hydroxy-3-indole)-alkylamine.

No references cited.